(12) United States Patent
Endo

(10) Patent No.: US 10,449,809 B2
(45) Date of Patent: Oct. 22, 2019

(54) PNEUMATIC TIRE

(71) Applicant: The Yokohama Rubber Co., LTD., Minato-ku, Tokyo (JP)

(72) Inventor: Hiroki Endo, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 158 days.

(21) Appl. No.: 15/039,385

(22) PCT Filed: Nov. 28, 2014

(86) PCT No.: PCT/JP2014/081582
§ 371 (c)(1),
(2) Date: May 25, 2016

(87) PCT Pub. No.: WO2015/080251
PCT Pub. Date: Jun. 4, 2015

(65) Prior Publication Data
US 2017/0157993 A1 Jun. 8, 2017

(30) Foreign Application Priority Data

Nov. 29, 2013 (JP) ................. 2013-247811

(51) Int. Cl.
*B60C 11/16* (2006.01)
(52) U.S. Cl.
CPC ...... *B60C 11/1637* (2013.01); *B60C 11/1625* (2013.01); *B60C 11/1656* (2013.01)
(58) Field of Classification Search
CPC ............. B60C 11/1625; B60C 11/1637; B60C 11/1656; B60C 11/14; B60C 11/16; B60C 11/1675

(Continued)

(56) References Cited

U.S. PATENT DOCUMENTS

| 3,426,822 A | 2/1969 | Trendowski |
| 3,693,688 A | 9/1972 | Schuman |
| 2011/0146865 A1 | 6/2011 | Durat et al. |

FOREIGN PATENT DOCUMENTS

| JP | 2010070052 A | * 4/2010 |
| JP | 2011-521829 | 7/2011 |

(Continued)

OTHER PUBLICATIONS

JP2010070052A—Machine Translation (Year: 2010).*
International Search Report for International Application No. PCT/JP2014/081582 dated Feb. 24, 2015, 4 pages, Japan.

*Primary Examiner* — Matthew J Daniels
*Assistant Examiner* — Yunju Kim
(74) *Attorney, Agent, or Firm* — Thorpe North & Western

(57) ABSTRACT

A pneumatic tire includes stud pins inserted into holes disposed in the tire surface. The stud pins each include a body portion and a flange disposed closer to the bottom side of each of the holes than the body portion and having an outer diameter larger than the body portion. The holes each include a securing portion coming into contact with the outer peripheral surface of the body portion of the stud pin to secure the stud pin and an enlarged diameter portion disposed closer to the bottom wall side of the hole than the securing portion, having an inner diameter larger than the securing portion, and coming into contact with the outer peripheral surface of the flange of the stud pin to secure the stud pin. The side wall of the enlarged diameter portion is provided with a protrusion protruding toward the interior of the hole.

3 Claims, 9 Drawing Sheets

(58) Field of Classification Search
USPC .......................................................... 152/210
See application file for complete search history.

(56) References Cited

FOREIGN PATENT DOCUMENTS

| | | |
|---|---|---|
| JP | 2013-180641 | 9/2013 |
| WO | WO 2009/144198 | 12/2009 |
| WO | WO 2012/117962 | 9/2012 |

\* cited by examiner

PNEUMATIC TIRE

TECHNICAL FIELD

The present technology relates to pneumatic tires with stud pins fitted into tread sections.

BACKGROUND ART

Conventional tires for icy/snowy road provide grip on icy road surfaces via stud pins fitted into the tread sections of the tires.

A spike (stud pin) for a tire that can achieve enhanced clawing force against a surface of ice and weight reduction is known as a stud pin (see International Patent Publication No. WO/2012/117962). The stud pin is provided with a columnar body to be secured to the tread surface with its one end side in the direction along its central axis fitted into a bottomed hole formed in the tread surface of the tire, and a pin protruding from the other end face of the columnar body in the direction along its central axis.

However, tires for icy/snowy road with stud pins travel not only on icy road surfaces, but also on concrete road surfaces and/or asphalt road surfaces. Since concrete road surfaces and/or asphalt road surfaces are harder than icy road surfaces, the force applied by the surfaces to the tires in braking, accelerating, or cornering may often cause drop of the stud pins (hereinafter referred to as pin drop). The pin drop thus needs to be prevented in the pneumatic studded tires.

SUMMARY

The present technology provides a pneumatic tire from which stud pins are difficult to drop.

According to an aspect of the present technology, a pneumatic tire includes a tire tread section and a plurality of stud pins. The tire tread section is provided with a plurality of holes in a tread surface thereof, the holes allowing the stud pins to be inserted therein. The stud pins are inserted into the holes. The stud pins each include a body portion and a flange disposed closer to a bottom side of each of the holes than the body portion and having an outer diameter larger than the body portion. The holes each include a securing portion coming into contact with an outer peripheral surface of the body portion of each of the stud pins to secure the stud pin and an enlarged diameter portion disposed closer to a bottom wall side of each of the holes than the securing portion, having an inner diameter larger than the securing portion, and coming into contact with an outer peripheral surface of the flange of each of the stud pins to secure the stud pin. The enlarged diameter portion includes a side wall coming into contact with the outer peripheral surface and provided with one or a plurality of protrusions protruding toward an interior of each of the holes. The protrusions each deform to match the outer peripheral surface of the flange inserted into the enlarged diameter portion, such that an entire surface of the protrusion comes into contact with the outer peripheral surface of the flange.

Preferably, the protrusions are disposed with spacing therebetween in a circumferential direction of the enlarged diameter portion.

Preferably, the side wall of the enlarged diameter portion is inclined such that a cross-sectional area of an opening orthogonal to a depth direction of the holes expands continuously toward the bottom wall.

Preferably, each of the protrusions is provided on a region of the side wall of the enlarged diameter portion, and when L represents a shortest distance along a surface of the side wall from an entrance-side end of the enlarged diameter portion to a bottom wall-side end of each of the holes, and L1 represents a distance from the entrance-side end of the enlarged diameter portion to an end, on an entrance side of the enlarged diameter portion, of the protrusion remotest from the entrance-side end of the enlarged diameter portion, a ratio of L1/L is 0.7 or less.

Preferably, each of the protrusions extends along the side wall of the enlarged diameter portion in the depth direction of the holes, and when L represents the shortest distance along the surface of the side wall from the entrance-side end of the enlarged diameter portion to the bottom wall-side end of each of the holes, and L2 represents a maximum extending length of the protrusion, a ratio of L2/L is 0.8 to 1.0.

Preferably, when D represents a diameter of a cylinder circumscribing the securing portion, and H represents a maximum protruding height of each of the protrusions from a protruding base to a protruding tip, a relationship of $0.15 \leq H/D \leq 0.25$ is satisfied.

Preferably, each of the protrusions extends along the side wall in the depth direction of the holes, and when D represents the diameter of the cylinder circumscribing the securing portion, and W represents a maximum value of widths of the protrusions in directions orthogonal to extending directions of the protrusions, a relationship of $0.15 \leq W/D \leq 0.45$ is satisfied.

Preferably, each of the protrusions is disposed annularly in a circumferential direction of the side wall of the enlarged diameter portion.

According to the above aspect, the present technology provides a pneumatic tire from which stud pins are more difficult to drop than conventional pneumatic tires.

DETAILED DESCRIPTION

A pneumatic tire according to an embodiment of the present technology will now be described.

Figure 1:
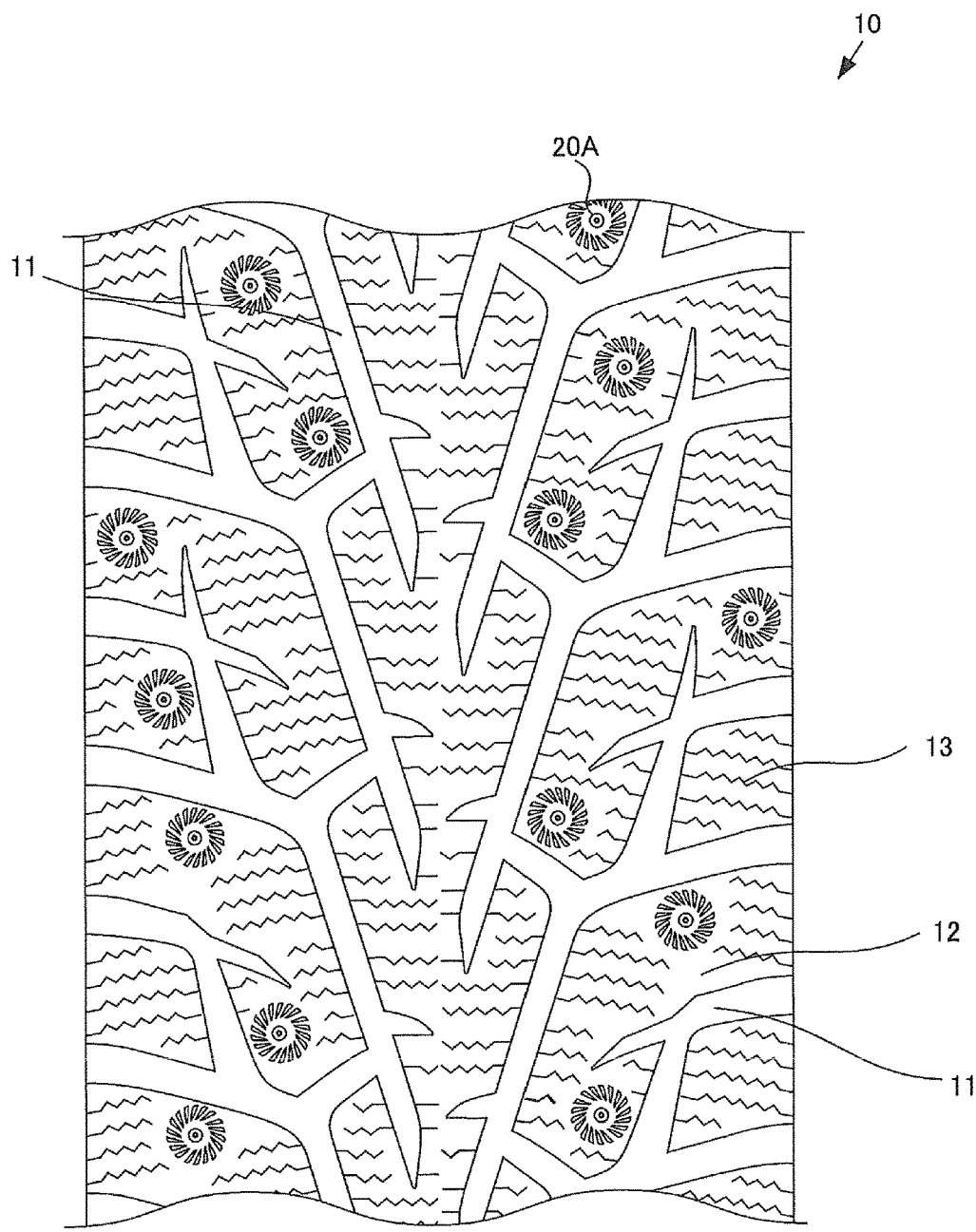
FIG. 1 is a planar development diagram illustrating a portion of a tread pattern of the tire of an embodiment developed on a plane.

FIG. 1 is a planar development diagram illustrating a portion of a tread pattern, developed on a plane, of a tread section 10 of the pneumatic tire (hereinafter referred to as a tire) in this embodiment.

Grooves 11 are formed in the tread section 10. The grooves 11 define a plurality of land parts 12. Sipes 13 are disposed in the surfaces (road contact surfaces) of the land parts 12. Holes 20A into which stud pins 50 (See FIG. 6) are fitted are disposed in the surfaces of the land parts 12. Fitting the stud pins 50 into the holes 20A allows the tire to function as a studded tire, resulting in an improvement in performance on ice, such as braking and turning on ice.

Figure 2:
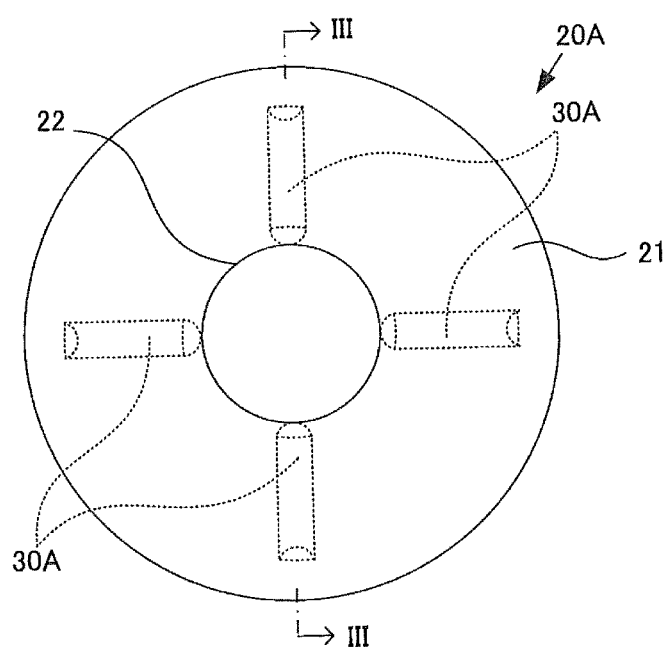
FIG. 2 is a plan view of a stud pin inserting hole 20A according to a first embodiment of the present technology, viewed from a tread section.
Figure 3:
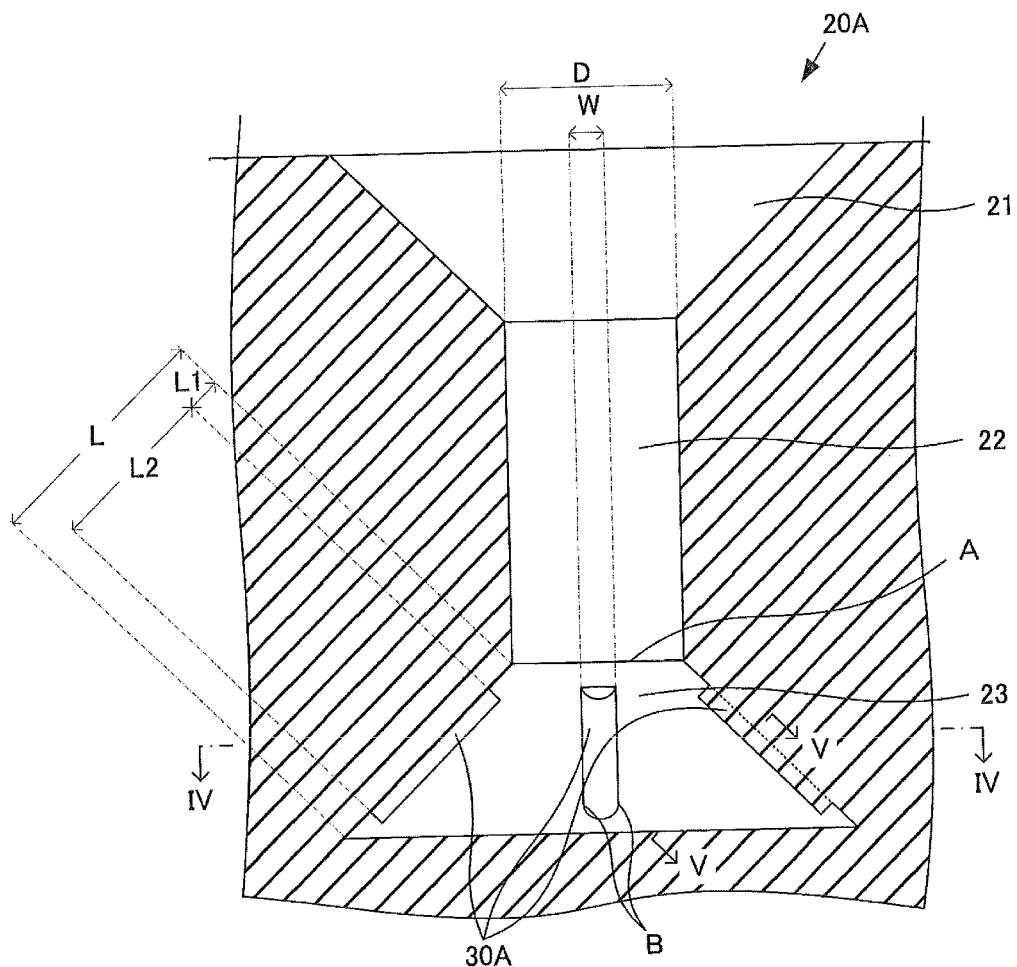
FIG. 3 is a cross-sectional view taken along the line III-III of FIG. 2.
Figure 4:
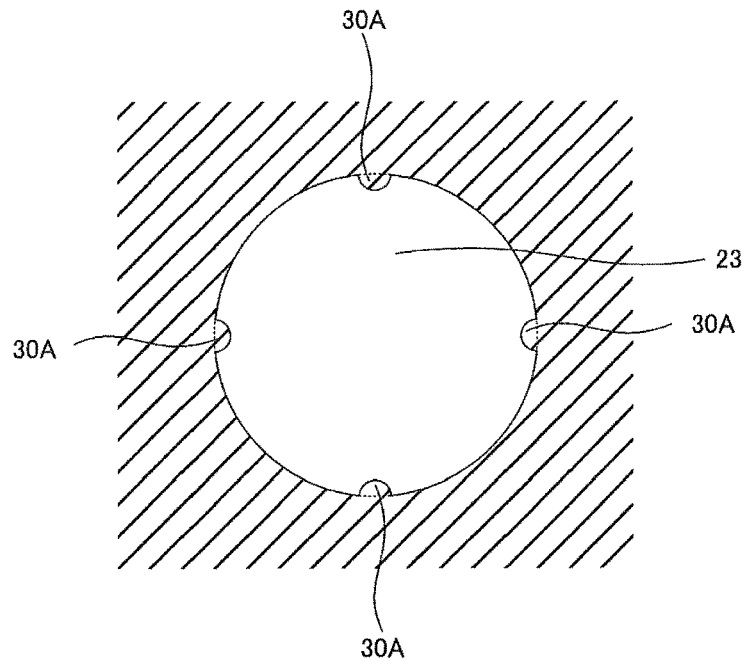
FIG. 4 is a cross-sectional view taken along the line IV-IV of FIG. 3.
Figure 5:
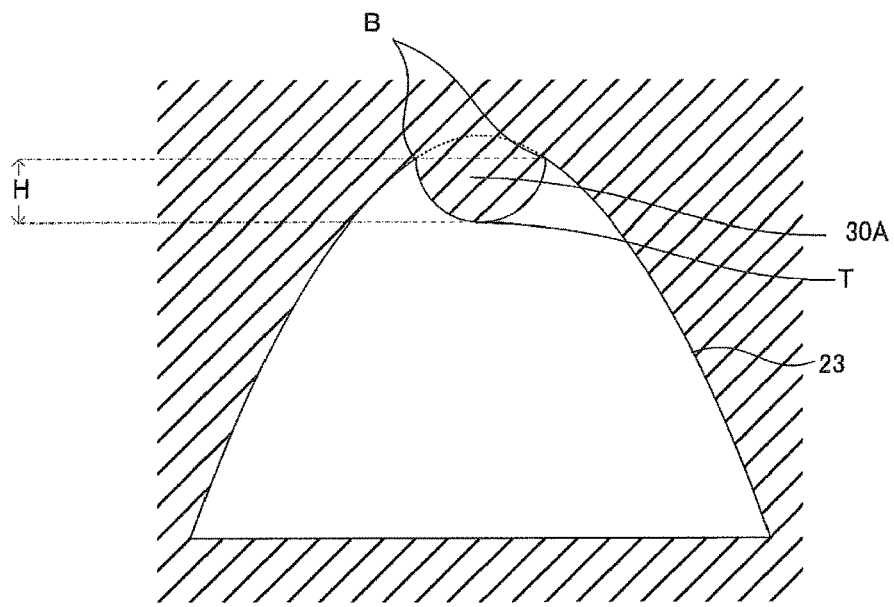
FIG. 5 is a cross-sectional view taken along the line V-V of FIG. 3.

FIG. 2 is a plan view of the hole 20A. FIG. 3 is a cross-sectional view taken along the line III-III of FIG. 2. FIG. 4 is a cross-sectional view taken along the line IV-IV of FIG. 3. FIG. 5 is a cross-sectional view taken along the line V-V of FIG. 3. The hole 20A includes an entrance portion 21, a securing portion 22, and an enlarged diameter portion 23 that are formed in this order from the surface of the land part 12 in the depth direction.

The cross-sectional area of the opening of the entrance portion 21 decreases from the surface of the land part 12 in the depth direction, approximately by half.

The securing portion 22 is provided extending in the depth direction from the deepest end of the entrance portion 21. The securing portion 22 is substantially cylindrical. The inner wall surface of the securing portion 22 comes into contact with the outer peripheral surfaces of a body portion 58 and a shank portion 56 of the stud pin 50 inserted inside, which will be described later. This configuration allows the securing portion 22 to press the outer peripheral surfaces of the body portion 58 and the shank portion 56 and to compress and secure the stud pin.

The enlarged diameter portion 23 is disposed closer to the bottom wall side of the hole 20A than the securing portion 22. The enlarged diameter portion 23 has a larger inner diameter than the securing portion 22. Preferably, the side wall of the enlarged diameter portion 23 is inclined such that the cross-sectional area of the opening orthogonal to the depth direction of the hole 20A expands continuously toward the bottom wall, up to approximately 1.8 times. For example, preferably, the side wall of the enlarged diameter portion 23 is inclined such that the inner space of the enlarged diameter portion 23 has a truncated cone shape as illustrated in FIG. 3. The inner wall surface of the enlarged diameter portion 23 comes into contact with the outer peripheral surface of a flange 54 of the stud pin 50 to secure the stud pin 50, which will be described later. The inclined side wall of the enlarged diameter portion 23 facilitates the insertion of the flange 54 of the stud pin 50 into the enlarged diameter portion 23.

The side wall of the enlarged diameter portion 23 is provided with one or a plurality of protrusions 30A protruding toward the interior of the hole 20A. The protrusion 30A deforms to match the outer peripheral surface of the flange 54 inserted into the enlarged diameter portion 23, such that the entire surface of the protrusion comes into contact with the outer peripheral surface of the flange 54. In this embodiment, the plurality of protrusions 30A is disposed with spacing therebetween in the circumferential direction of the enlarged diameter portion 23 as illustrated in FIGS. 2 and 3.

When L1 represents the distance from the entrance-side end A of the enlarged diameter portion 23 to the end, on the entrance side of the enlarged diameter portion 23, of the protrusion 30A remotest from the entrance-side end A of the enlarged diameter portion as illustrated in FIG. 3, the ratio of L1/L is preferably 0.7 or less.

In other words, when L represents the shortest distance along the side wall surface from the entrance-side end A of the enlarged diameter portion 23 to the bottom wall-side end B of the hole 20A, each protrusion 30A is preferably provided in the region on the side wall of the enlarged diameter potion 23 between the entrance-side end A of the enlarged diameter potion 23 and a position remote from the entrance-side end A toward the bottom wall by 0.7L. L1 may be 0. In other words, the end, on the entrance side of the enlarged diameter portion 23, of the protrusion 30A may coincide with the entrance-side end A of the enlarged diameter portion 23.

Each protrusion 30A preferably extends along the side wall of the enlarged diameter portion 23 in the depth direction of the hole 20A as illustrated in FIGS. 2 and 3. When L2 represents the maximum extending length of the protrusion 30A as illustrated in FIG. 3, the relationship of $0.8 \leq L2/L \leq 1.0$ is preferably satisfied. A ratio of L2/L of less than 0.8 provides insufficient compressing force against the flange 54 of the stud pin 50. The ratio of L2/L cannot be greater than 1.

If the securing portion 22 is cylindrical, D represents the diameter of the securing portion 22 as illustrated in FIGS. 2 and 3. H represents the protruding height of the protrusion 30A from the protruding base B to the protruding tip T as illustrated in FIG. 5. In this case, the relationship of $0.15 \leq H/D \leq 0.25$ is preferably satisfied. If the securing portion 22 is not cylindrical, when D represents the diameter of the cylinder circumscribing the inner wall surface of the securing portion 22, and H represents the protruding height of the protrusion 30A from the protruding base B to the protruding tip T, the relationship of $0.15 \leq H/D \leq 0.25$ is preferably satisfied. In case of a plurality of protrusions 30A, when H represents the maximum value of the protruding heights, the relationship of $0.15 \leq H/D \leq 0.25$ is preferably satisfied. A ratio of H/D of less than 0.15 provides insufficient compressing force against the flange 54 of the stud pin 50. A ratio of H/D of greater than 0.25 provides sufficient compressing force against the flange 54 of the stud pin 50 but requires stronger force in inserting the flange 54 of the stud pin 50 into the enlarged diameter portion 23, resulting in a decrease in workability.

When W represents the width of the protrusion 30A in the direction orthogonal to the extending direction of the protrusion 30A (the distance between the protruding bases B and B in the circumferential direction) as illustrated in FIG. 3, the relationship of $0.15 \leq W/D \leq 0.45$ is preferably satisfied. In case of a plurality of protrusions 30A, when W represents the maximum value of the widths of the protrusions 30A, the relationship of $0.15 \leq W/D \leq 0.45$ is preferably satisfied. A ratio of W/D of less than 0.15 provides insufficient compressing force against the flange 54 of the stud pin 50. A ratio of W/D of greater than 0.45 provides sufficient compressing force against the flange 54 of the stud pin 50 but requires stronger force in inserting the flange 54 of the stud pin 50 into the enlarged diameter portion 23, resulting in a decrease in workability.

Stud Pin

Figure 6:
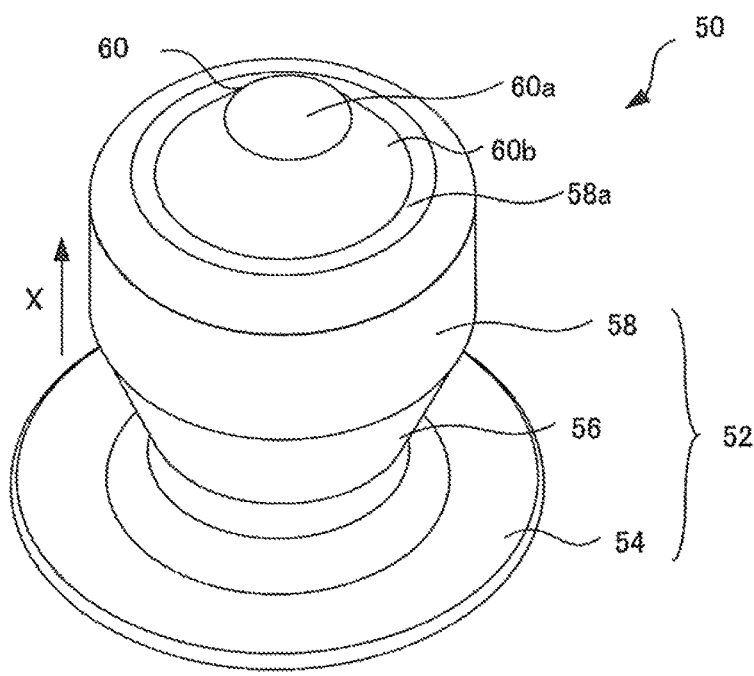
FIG. 6 is a perspective view of a stud pin 50.

FIG. 6 is an external perspective view of the stud pin 50 according to the first embodiment of the present technology. The stud pin 50 mainly includes a buried base portion 52 and a tip portion 60 that are formed in this order in the X direction.

The buried base portion 52 is pressed by the inner wall surface of the enlarged diameter portion 23 of the hole 20A. This configuration secures the stud pin 50 in the tread section.

The stud pin 50 includes the buried base portion 52 and the tip portion 60. When the stud pin 50 is fitted into the hole 20A, the X direction coincides with the direction of the normal to the surface of the land part 12.

The buried base portion 52 includes the flange 54, the shank portion 56, and the body portion 58 that are formed in this order in the X direction.

The flange 54 is located on an end opposite the tip portion 60. The flange 54 is a disk-shaped flange and prevents rotation of the stud pin 50 in the stud pin installation hole 45 when the stud pin 50 receives force from the road surface.

The shank portion 56 connects the body portion 58 to the flange 54. The shank portion 56 has a truncated cone shape with a diameter less than both the maximum outer diameter of the flange 54 and the maximum outer diameter of the body portion 58. The shank portion 56 is formed as a recessed portion relative to the body portion 58 and the flange 54, and the flange 54 and the body portion 58 are formed like flanges.

The body portion 58 that is cylindrical is located between the shank portion 56 and the tip portion 60, and is connected to the tip portion 60. The body portion 58 is embedded in a tread rubber member 18, with an upper end surface 58a of the body portion 58 being exposed to be substantially flush with the tread surface when the stud pin 50 is fitted into the tire.

The tip portion 60 protrudes from the tread surface when the stud pin 50 is fitted into the tread section, and comes into contact with the road surface or claws into the ice. The tip portion 60 has a truncated cone shape protruding from the upper end surface 58a of the buried base portion 52. The tip of the tip portion 60 (the end in the X direction) is formed into a flat surface 60a perpendicular to the extending direction of the buried base portion 52 (X direction). The tip portion 60 includes an inclined side surface 60b extending from the outer periphery of the flat surface 60a to the upper end surface 58a of the buried base portion 52. The inclined side surface 60b has an acute angle of inclination θ with respect to the upper end surface 58a of the body portion 58. The angle of inclination is preferably from 30 to 60 degrees.

The tip portion 60 may be made from the same metal material as that of the buried base portion 52 or of different metal material. For example, the buried base portion 52 and the tip portion 60 may be made from aluminum. Also, the buried base portion 52 may be made from aluminum and the tip portion 60 may be made from tungsten carbide. In the case that the buried base portion 52 and the tip portion 60 are made from different metal materials, the tip portion 60 can be anchored to the buried base portion 52 by hammering a protruding portion (not illustrated) provided on the tip portion 60 to mate the tip portion 60 with a hole (not illustrated) formed in the upper end surface 58a of the body portion 58 of the buried base portion 52.

Figure 7:
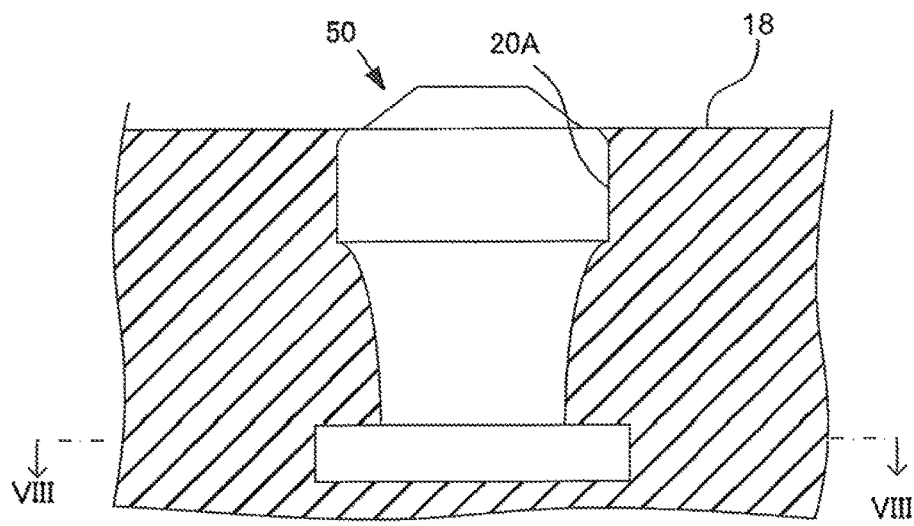
FIG. 7 is a cross-sectional view of the stud pin 50 inserted into the hole 20A.
Figure 8:
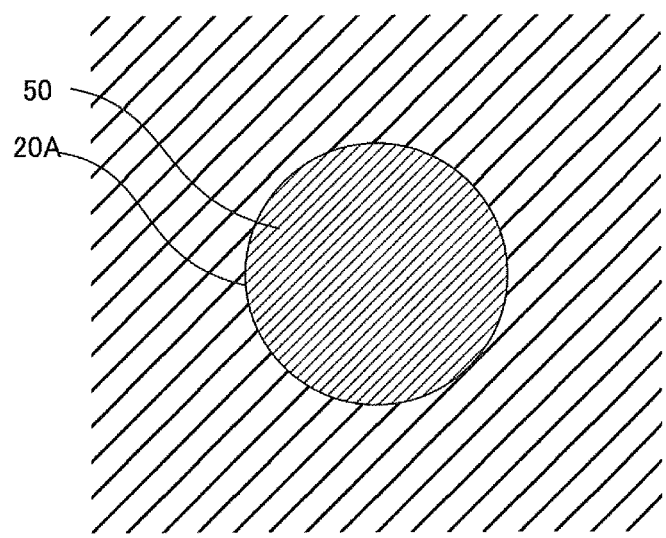
FIG. 8 is a cross-sectional view taken along the line VIII-VIII of FIG. 7.

FIG. 7 is a cross-sectional view of the stud pin 50 inserted into the hole 20A. FIG. 8 is a cross-sectional view taken along the line VIII-VIII of FIG. 7. As illustrated in FIGS. 7 and 8, when the stud pin 50 is inserted into the hole 20A, the inner wall surface of the hole 20A presses the outer peripheral surface of the stud pin 50, causing the stud pin 50 to be compressed and secured in the tread section 10. The outer diameter of the flange 54 is larger than the inner diameter of the enlarged diameter portion 23, such that the protrusion 30A deforms to match the outer peripheral surface of the flange 54 and comes into close contact with the outer peripheral surface of the flange 54. Consequently, no gap is formed between the surface of the protrusion 30A and the outer peripheral surface of the flange 54.

As described above, according to the embodiment of the present technology, the protrusion 30A protruding toward the interior of the enlarged diameter portion 23 of the hole 20A deforms to match the outer peripheral surface of the flange 54 of the stud pin 50 inserted into the securing portion 22. This configuration presses the outer peripheral surface of the flange 54 and compresses and secures the stud pin 50, preventing the stud pin 50 from dropping. The hole 20A can thus hold the stud pin 50 with improved force.

FIRST MODIFIED EXAMPLE

Figure 9:
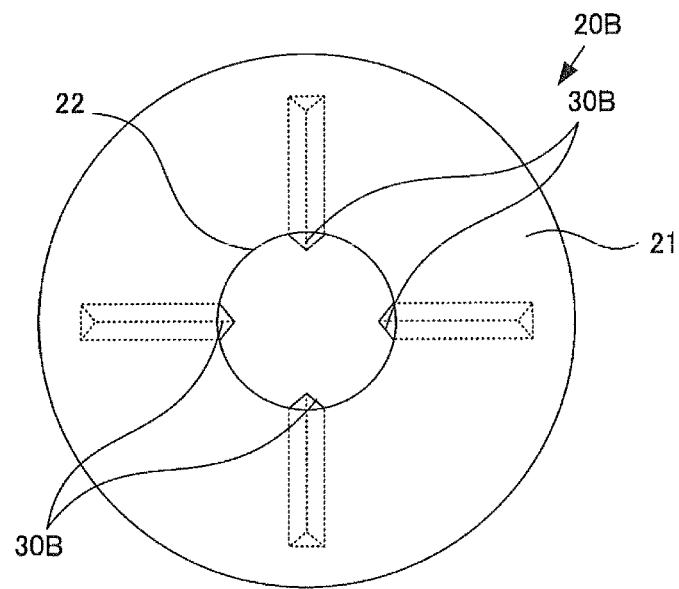
FIG. 9 is a plan view of a hole 20B according to a modified example of the present technology, viewed from the tread section.

FIG. 9 is a plan view of a hole 20B according to a first modified example of the present technology, viewed from the tread section. In this modified example, protrusions 30B have a substantially triangular shape, which is different from the protrusion 30A in the above embodiment. Even with the protrusions 30B having such a shape, the protrusions 30B provided on the inner wall of the enlarged diameter portion 23 of the hole 20B deform to match the outer peripheral surface of the flange 54 of the stud pin 50 inserted into the enlarged diameter portion 23. This configuration presses the outer peripheral surface of the flange 54 and compresses and secures the stud pin, preventing the stud pin from dropping. The hole 20B can thus hold the stud pin 50 with improved force.

SECOND MODIFIED EXAMPLE

Figure 10:
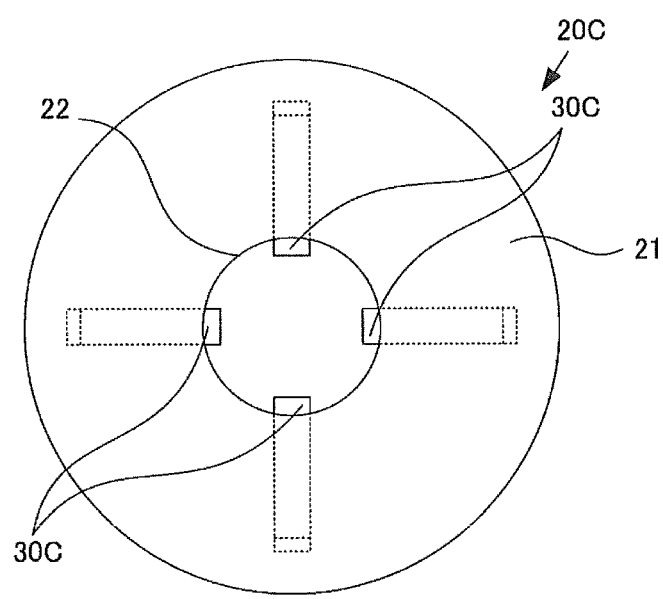
FIG. 10 is a plan view of a hole 20C according to a modified example of the present technology, viewed from the tread section.

FIG. 10 is a plan view of a hole 20C according to a second modified example of the present technology, viewed from the tread section. In this modified example, protrusions 30C have a substantially quadrangular-prismatic shape, which is different from the protrusion 30A in the above embodiment. Even with the protrusions 30C having such a shape, the protrusions 30C provided on the inner wall of the enlarged diameter portion 23 of the hole 20C, protruding toward the interior of the hole 20C, and extending in the depth direction of the hole 20C deform to match the outer peripheral surface of the flange 54 of the stud pin 50 inserted into the enlarged diameter portion 23. This configuration presses the outer peripheral surface of the flange 54 and compresses and secures the stud pin 50, preventing the stud pin 50 from dropping. The hole 20C can thus hold the stud pin 50 with improved force.

THIRD MODIFIED EXAMPLE

Figure 11:
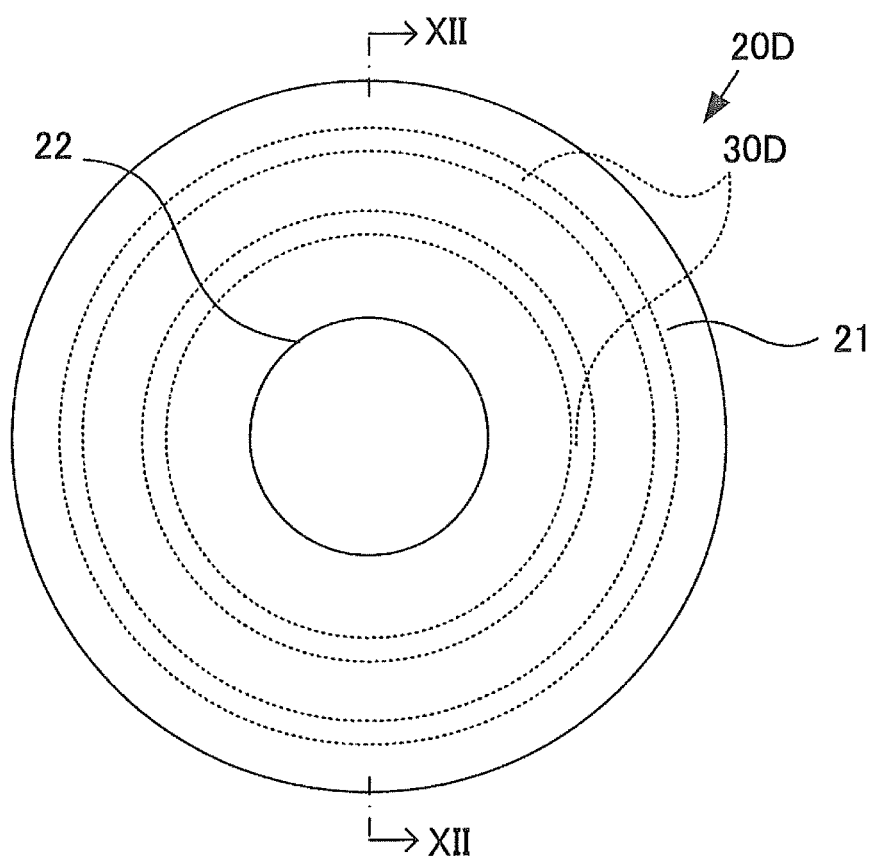
FIG. 11 is a plan view of a hole 20D according to a modified example of the present technology, viewed from the tread section.
Figure 12:
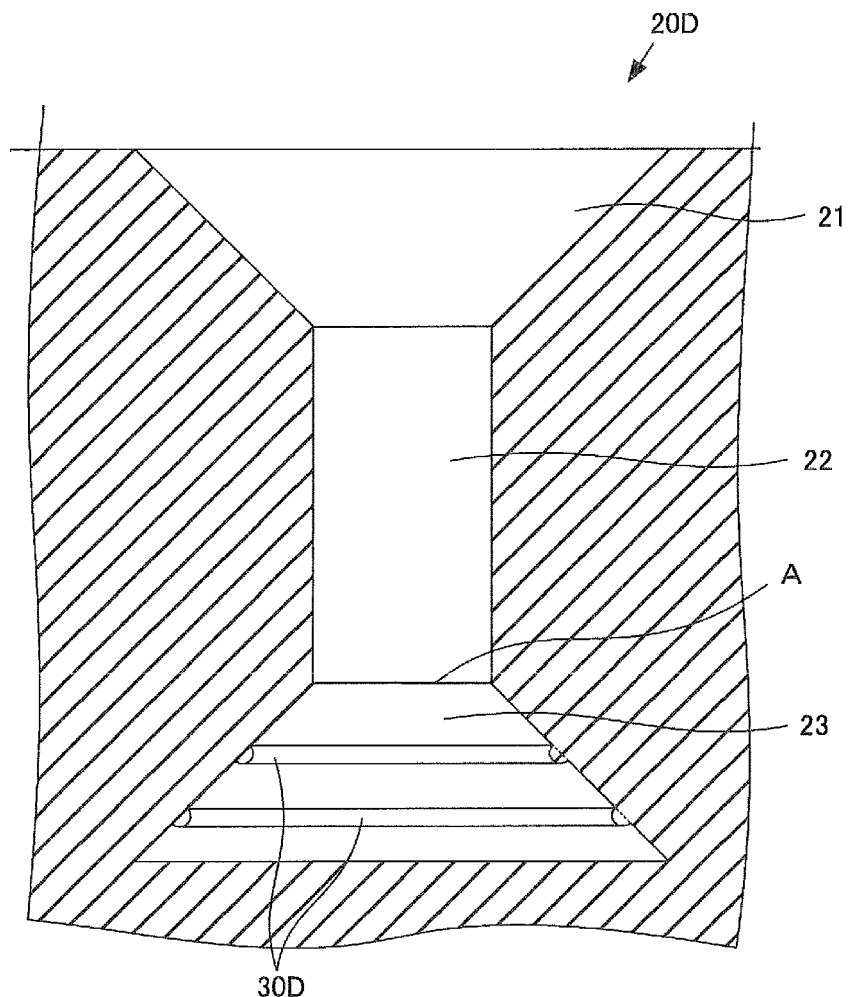
FIG. 12 is a cross-sectional view taken along the line XII-XII of FIG. 11.

FIG. 11 is a plan view of a hole 20D according to a third modified example of the present technology, viewed from the tread section. FIG. 12 is a cross-sectional view taken along the line XII-XII of FIG. 11. In this modified example, one or a plurality of protrusions 30D is disposed annularly in the circumferential direction of the inner wall of the enlarged diameter portion. Even with the protrusions 30D having such a shape, the protrusions 30D provided on the inner wall of the enlarged diameter portion 23 of the hole 20D and protruding toward the interior of the hole 20D deform to match the outer peripheral surface of the flange 54 of the stud pin 50 inserted into the enlarged diameter portion 23. This configuration presses the outer peripheral surface of the flange 54 and compresses and secures the stud pin 50, preventing the stud pin 50 from dropping. The hole 20D can thus hold the stud pin 50 with improved force.

Experiment

To test the effects of the tire according to the embodiment, the stud pins illustrated in FIG. 6 were fitted in the tire, provided with the stud pin installation holes in the tread section, illustrated in FIG. 1. The configurations of the holes are described in the following Comparative Example 1 and Working Examples 1 to 14.

Tables 1 and 2 show the ratios of L1/L and L2/L in Working Examples 1 to 14 where L represents the shortest distance along the side wall surface from the entrance-side end of the enlarged diameter portion to the bottom wall-side end of the hole, L1 represents the distance from the entrance-side end of the enlarged diameter portion to the end, on the entrance side of the enlarged diameter portion, of the protrusion remotest from the entrance-side end of the enlarged diameter portion, and L2 represents the extending length of the protrusion along the side wall of the enlarged diameter portion in the depth direction of the hole. Tables 1 and 2 also summarize the ratios of H/D and W/D where D represents the diameter of the securing portion, H represents the protruding height of the protrusion from the protruding base to the protruding tip, and W represents the distance between the protruding bases of the protrusion in the circumferential direction. No protrusion was provided in Comparative Example 1.

The tires were fitted to a passenger vehicle to check pin drop resistance and pin driving performance.

The size of each manufactured tire was 205/55R16. The passenger vehicle used was a front-wheel drive sedan with an engine displacement of 2000 cc. The internal pressure condition of the tires was 230 (kPa) for both the front wheels and rear wheels. The load condition of the tires was a 450 kg load on the front wheels and a 300 kg load on the rear wheels.

Pin Drop Resistance

As pin drop resistance, the proportion of the number of stud pins remaining in the tread section to the total number of fitted stud pins was obtained after the vehicle traveled 1000 km on a dry road surface including asphalt road surfaces or concrete road surfaces.

The proportion of remaining stud pins was indexed with reference to the proportion of remaining stud pins in Comparative Example 1 (index of 100).

The results are shown in Tables 1 and 2.

Pin Driving Performance

The working time taken for driving all of a fixed number of stud pins into a single tire with the same stud gun was measured. The working time was indexed with reference to the inverse of the working time in Comparative Example 1 (index of 100).

The results are shown in Tables 1 and 2.

TABLE 1

|  | Comparative Example | Working Example | | | | | |
|---|---|---|---|---|---|---|---|
|  | 1 | 1 | 2 | 3 | 4 | 5 | 6 |
| Presence/absence of protrusions | Absent | Present | Present | Present | Present | Present | Present |
| L1/L | — | 0.60 | 0.70 | 0.80 | 0.30 | 0.20 | 0.10 |
| L2/L | — | 0.20 | 0.20 | 0.20 | 0.70 | 0.80 | 0.90 |
| H/D | — | 0.20 | 0.20 | 0.20 | 0.20 | 0.20 | 0.20 |
| W/D | — | 0.30 | 0.30 | 0.30 | 0.30 | 0.30 | 0.30 |
| Pin drop resistance | 100 | 102 | 104 | 105 | 106 | 109 | 110 |
| Pin driving performance | 100 | 99 | 99 | 99 | 98 | 97 | 96 |

TABLE 2

|  | Working Example | | | | | | | |
|---|---|---|---|---|---|---|---|---|
|  | 7 | 8 | 9 | 10 | 11 | 12 | 13 | 14 |
| Presence/absence of protrusions | Present | Present | Present | Present | Present | Present | Present | Present |
| L1/L | 0.10 | 0.10 | 0.10 | 0.10 | 0.10 | 0.10 | 0.10 | 0.10 |
| L2/L | 0.90 | 0.90 | 0.90 | 0.90 | 0.90 | 0.90 | 0.90 | 0.90 |
| H/D | 0.10 | 0.15 | 0.25 | 0.30 | 0.20 | 0.20 | 0.20 | 0.20 |
| W/D | 0.30 | 0.30 | 0.30 | 0.30 | 0.10 | 0.15 | 0.45 | 0.5 |
| Pin drop resistance | 104 | 108 | 114 | 112 | 114 | 116 | 114 | 116 |
| Pin driving performance | 98 | 97 | 95 | 94 | 98 | 97 | 95 | 94 |

On comparison between Comparative Example 1 and Working Examples 1 to 14 shown in Table 1, it is understood that providing a protrusion improves pin drop resistance.

On comparison between Working Examples 1 to 3, it is understood that a ratio of L1/L of 0.7 or greater significantly improves pin drop resistance in comparison with a ratio of L1/L of less than 0.7.

On comparison between Working Examples 4 to 6, it is understood that a ratio of L2/L of 0.125 or greater significantly improves pin drop resistance in comparison with a ratio of L2/L of less than 0.125.

On comparison between Working Examples 6 to 10, it is understood that a ratio of H/D of 0.15 or greater significantly improves pin drop resistance in comparison with a ratio of H/D of less than 0.15. It is also understood that a ratio of H/D of greater than 0.25 significantly decreases pin driving performance.

On comparison between Working Examples 6 and 11 to 14, it is understood that a ratio of W/D of 0.15 or greater significantly improves pin drop resistance in comparison with a ratio of W/D of less than 0.15. It is also understood that a ratio of W/D of greater than 0.45 significantly decreases pin driving performance.

The pneumatic tire according to the present technology has been described in detail. However, the pneumatic tire according to the present technology is not limited to the above embodiment and may be enhanced or modified in various ways within the scope of the present technology.

The invention claimed is:

1. A pneumatic tire comprising:
a tire tread section; and
a plurality of stud pins;
the tire tread section being provided with a plurality of holes in a tread surface thereof, the holes allowing the stud pins to be inserted therein and the holes deforming from an undeformed state in which the stud pins are not inserted in the holes to a deformed state with insertion of the stud pins therein;
the stud pins being inserted into the holes;
the stud pins each including:
a body portion and a disk-shaped flange disposed closer to a bottom side of each of the holes than the body portion; and
the flange having an outer diameter larger than the body portion;
the holes each including:
a securing portion coming into contact with an outer peripheral surface of the body portion of each of the stud pins to secure the stud pin; and
an enlarged diameter portion disposed closer to a bottom wall side of each of the holes than the securing portion, the enlarged diameter portion having an inner diameter larger than the securing portion, the enlarged diameter portion coming into contact with an outer peripheral surface of the flange of each of the stud pins to secure the stud pin;
the enlarged diameter portion including a side wall coming into contact with the outer peripheral surface of the flange, the side wall being provided with a plurality of protrusions protruding toward an interior of each of the holes in the undeformed state, the protrusions being disposed with spacing therebetween in a circumferential direction of the enlarged diameter portion;
the side wall, in the undeformed state, of the enlarged diameter portion being inclined such that a cross-sectional area of an opening orthogonal to a depth direction of the holes expands continuously toward a bottom wall;
a relationship of $0.15 \leq W/D \leq 0.45$ being satisfied where D represents a diameter of a cylinder circumscribing the securing portion in the undeformed state and W represents a maximum value of widths of the protrusions in the undeformed state in directions orthogonal to extending directions of the protrusions; and
the protrusions each deforming in the deformed state to match the outer peripheral surface of the flange inserted into the enlarged diameter portion, such that an entire surface of the protrusion comes into contact with the outer peripheral surface of the flange; wherein:
each of the protrusions extends along the side wall of the enlarged diameter portion, in the undeformed state, in the depth direction of the holes;
when L represents the shortest distance along the surface of the side wall from the entrance-side end of the enlarged diameter portion to the bottom wall-side end of each of the holes, and L2 represents a maximum extending length of the protrusion in the undeformed state, a ratio of L2/L is 0.8 to 1.0; and
a cross sectional shape of the holes orthogonal to the depth direction at a position in the depth direction in which the protrusions contact with the outer peripheral surface of the flange in the deformed state is a circular shape.

2. The pneumatic tire according to claim 1, wherein:
each of the protrusions is provided on a region of the side wall of the enlarged diameter portion; and
when L represents a shortest distance along a surface of the side wall in the undeformed state from an entrance-side end of the enlarged diameter portion to a bottom wall-side end of each of the holes, and L1 represents a distance in the undeformed state from the entrance-side end of the enlarged diameter portion to an end, on an entrance side of the enlarged diameter portion, of the protrusion remotest from the entrance-side end of the enlarged diameter portion, a ratio of L1/L is 0.7 or less.

3. The pneumatic tire according to claim 1, wherein when D represents a diameter of a cylinder circumscribing the securing portion in the undeformed state, and H represents a maximum protruding height of each of the protrusions in the undeformed state from a protruding base to a protruding tip, a relationship of $0.15 \leq H/D \leq 0.25$ is satisfied.

* * * * *